United States Patent [19]

Resler et al.

[11] 4,088,987
[45] May 9, 1978

[54] FLUID LEAK ALARM SYSTEM

[76] Inventors: Glen Leroy Resler, 1015 Stuart St., Longmont, Colo. 80501; Gerald Lance Schlatter, 1840 N. 55 St., Box 346, Boulder, Colo. 80301

[21] Appl. No.: 699,485

[22] Filed: Jun. 24, 1976

[51] Int. Cl.² .......................................... G08B 21/00
[52] U.S. Cl. ................................... 340/242; 340/216; 73/40.5 R
[58] Field of Search ................ 340/58, 216, 240, 242, 340/310 R; 73/40.5 R

[56] References Cited
U.S. PATENT DOCUMENTS

| | | | |
|---|---|---|---|
| 3,222,642 | 12/1965 | Berill | 340/58 |
| 3,818,466 | 6/1974 | Honda | 340/216 |
| 3,935,567 | 1/1976 | Reynolds | 340/242 |

Primary Examiner—Alvin H. Waring
Attorney, Agent, or Firm—Burton & Dorr

[57] ABSTRACT

A fluid leak alarm system for detecting leaks in the fluid delivery lines located for example in a fuel filling or bulk station or other pressure lines is designed to have a detector with a pressure sensor mounted into each fuel delivery line of the different product lines and a transmitter for transmitting over conventional electrical power lines a unique code identifying the fuel line in the event of a leak. The fuel leak alarm system is further designed to have a remotely located receiver which is responsive to the uniquely coded signal transmitted over the electrical power line for extracting the signal from the power line and sounding an alarm which identifies the leaking fuel delivery line. A plurality of unique codes identify the delivery lines for the different product lines so that any electrical interference which may be picked up by the power lines is ignored by the receiver which responds only to the unique codes. The pressure detector is further designed to incorporate a bellows driven piston which interacts with a photo switch to minimize the danger of fuel explosion.

44 Claims, 10 Drawing Figures

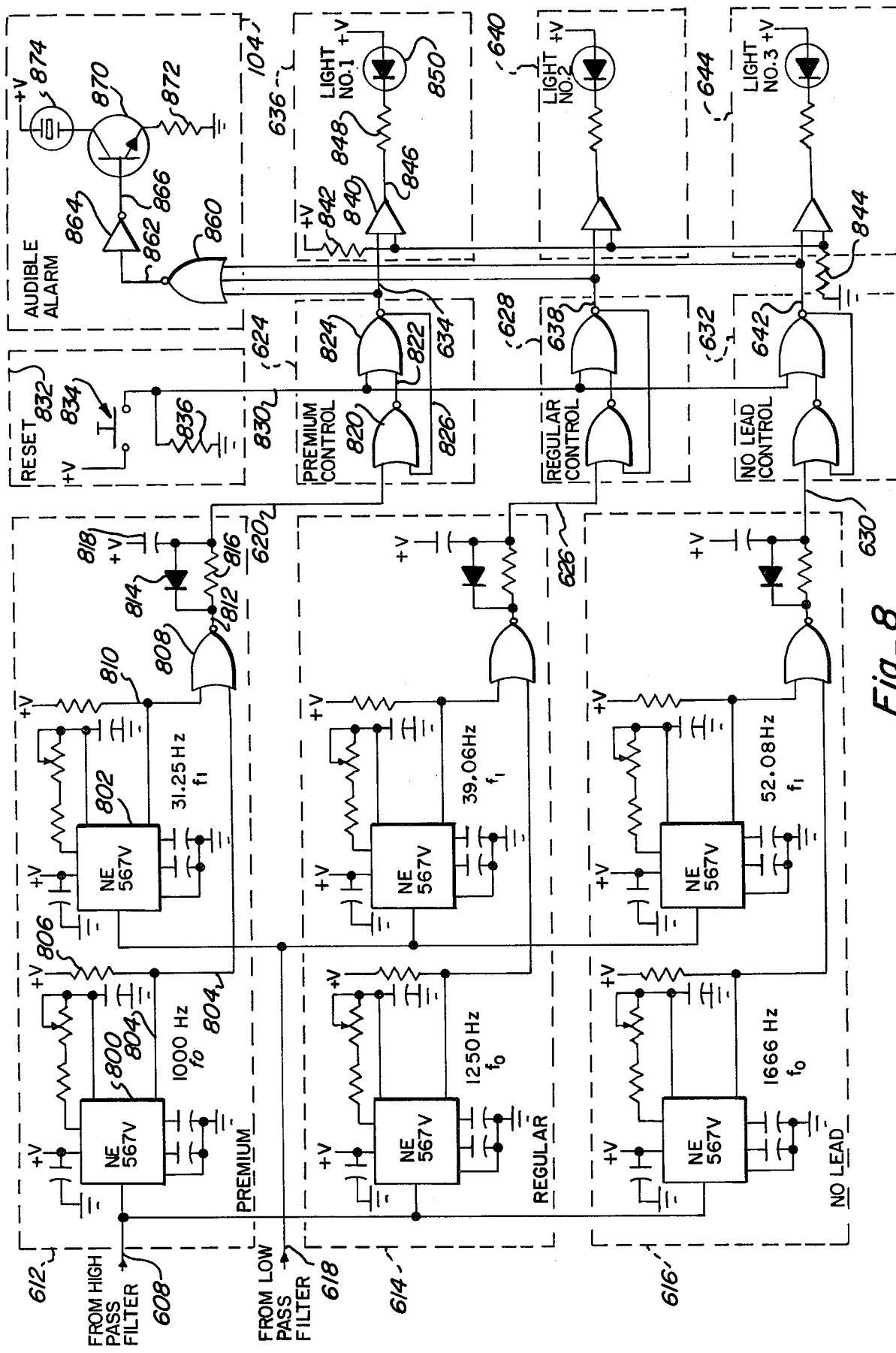

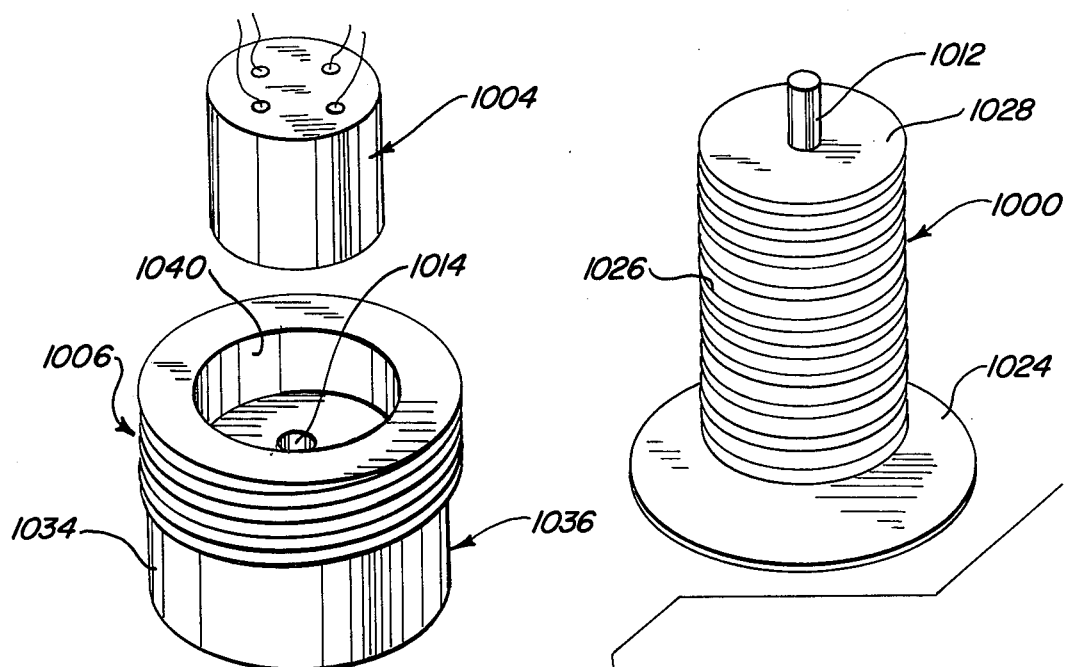
Fig_9
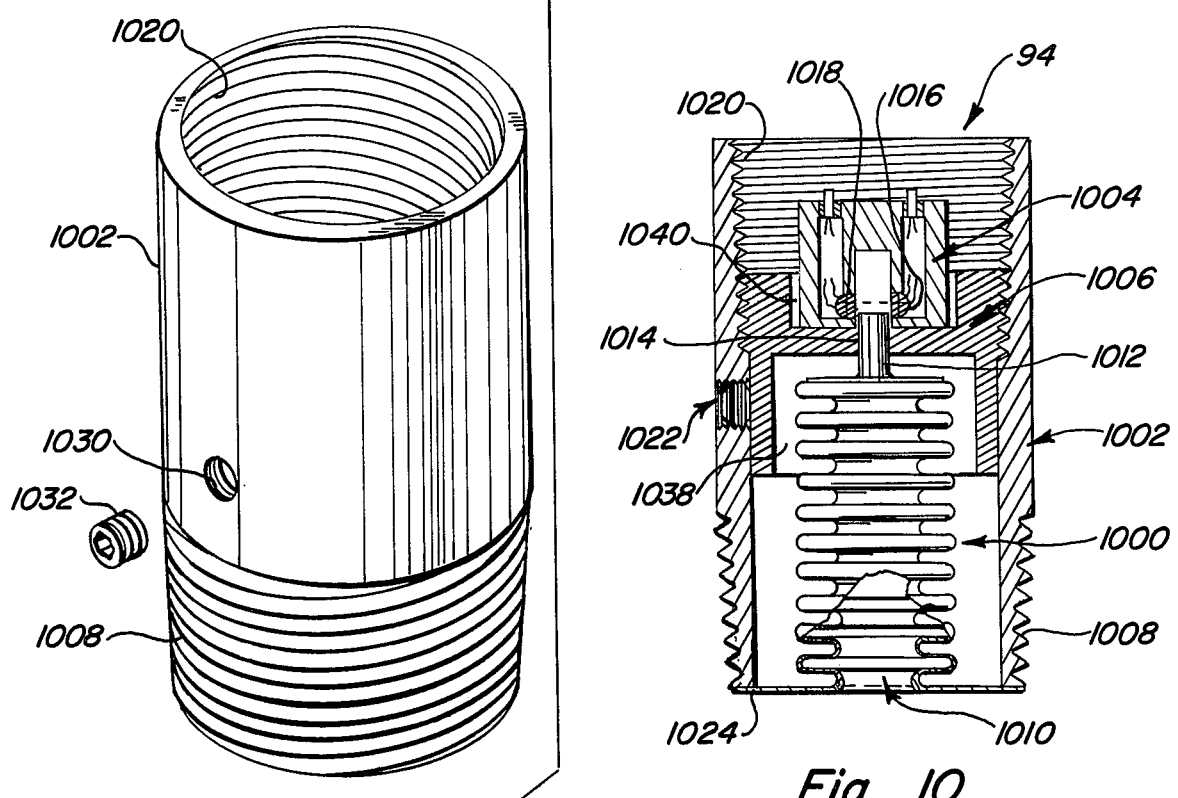
Fig_10

4,088,987

FLUID LEAK ALARM SYSTEM

BACKGROUND OF THE INVENTION

1. Field of the Invention

The present invention relates generally to alarm systems for detecting leaks in fluid delivery lines and, more particularly, to an alarm system specifically adapted for application to and retrofitable with conventional bulk and fuel filling stations.

2. Description of the Prior Art

Prior fluid leak alarms have been primarily of a mechanical nature which are expensive, require extensive installation effort, and tend to restrict pump flow.

A more recent prior art approach by Reynolds in U.S. Pat. No. 3,935,567 attempts to overcome the above prior art problems. The Reynolds approach, as stated in the above-identified specification, comprises:

Three essential elements—a pressure-sensitive switch, a timing circuit which measures the lead-down in pressure of the line between the pump and the dispensing nozzle, and an indicator means responsive to either a leak or non-leak condition. If a predetermined drop in pressure is measured by the pressure-sensitive switch, a circuit is operated which turns on an indicator light, thereby visually indicating a defective or leaky system. If no leak is detected, a non-leak indicator light is turned on denoting that the system is satisfactory.

Unfortunately, the Reynolds approach is not truly retrofitable to existing filling stations. Reynolds relies upon two wires coming from each product line or dispenser, in which case the concrete must be disrupted to bury the wires beneath the ground or pulled through existing sealed conduits or in which case the wires coming from the dispenser to the gas station are above the ground but pose a hazard and reliability problem. With so many wires, another problem apparent in Reynolds is that the wires act as antennas and, therefore, excessive engine electrical noise, signals from CB transmitters, or other electrical interference can be picked up by the interconnecting wires and extended into the remote detector located in the filling station to trigger perhaps a false alarm. If the wires are placed above the ground a safety hazard may arise due to tripping or the like. Also, the wires, if above ground, may be severed or otherwise damaged. Furthermore, the Reynolds approach requires the use of two indicators per line.

More recent descriptive literature from Reynolds Engineering, 1251 W. Lehigh Pl., Englewood, Colo., discloses an improved alarm system over the above Reynolds patent. The descriptive literature, while not disclosing the electrical circuit, reduces the number of wires coming from each product line from two to one. Furthermore, provision is now made in the improved alarm system by Reynolds to indicate Premium, Regular, and Unleaded product lines in a single remote alarm package. The problems of installation costs, radiation pick-up, or safety, however, are not overcome by the improved Reynolds approach.

The present invention overcomes the difficulties presented by the above prior art approaches by providing, for the first time, the complete elimination of interconnecting wires between the remote alarm located in the filling station building, and the detectors located at the dispensers for each of the different product lines. The present invention utilizes the conventionally buried power line which delivers electrical power from the station to the dispensers for transmission of alarm signals. This approach eliminates the need for any separate interconnecting wires, and eliminates the need for tearing up or otherwise modifying the concrete or asphalt surface between the dispensers and the station.

Furthermore, this new and novel invention utilizes coded signaling techniques that provide for each product line a unique frequency modulated (FM) and amplitude modulated (AM) signal which is extended over the power line from the dispenser to the remote alarm. The use of such uniquely different codes prevents any false indications which may arise from ambient electrical noise such as automotive electrical noise, CB transmission interference, or any other electrical interference.

Furthermore, the present invention can detect leaks occurring in the fuel delivery line whenever fuel is being pumped and for a predetermined time after the pumping is deactivated. Prior art approaches do not provide such a comprehensive time span of testing.

In addition, the present invention can be tested daily to ensure proper working operation. When the attendant arrives to turn the various product lines on, he can verify the total integrity of the system. Prior art approaches do not provide such integrity double checks.

Also, since interconnecting wires are not used and conventional power delivery lines are used, the installation cost of the present invention is substantially lower than any of the above prior art approaches.

Finally, the present invention provides a fully portable remote alarm since the alarm can be plugged into any electrical outlet within the filling station building. This is highly desirable since the user can selectively reposition the alarm with a minimum of effort. None of the above prior art approaches contemplate such mobility or convenience to the user.

OBJECTS OF THE INVENTION

It is an object of the present invention to provide a new and novel alarm system for detecting leaks in fuel delivery lines wherein signals are transmitted from the pressure detector to a remote alarm over an interconnecting electrical power line.

It is another object of the present invention to provide a new and novel device for detecting leaks in fuel delivery lines wherein the pressure sensor mounted in the fuel delivery line is responsive to a drop in pressure below a predetermined value for activating the transmittal of a signal over an electrical power line which is interconnected at a remote end to a warning device that is receptive of the transmitted signal to issue a warning.

It is still another object of the present invention to provide a new and novel device for detecting a leak in a fuel delivery system wherein the system uses an alarm remote from the delivery lines, a plurality of detectors, a power line interconnecting the alarm with a plurality of detectors, and in which each of the detectors is cooperative with the pressure of the fuel in it's associated delivery line dropping below a predetermined value during fuel delivery for extending a signal over the power line to the remote alarm and wherein the alarm is further receptive of the extended signal for becoming activated and for identifying which of the delivery lines is leaking.

It is still another object of the present invention to provide a new and novel leak alarm system wherein said system includes an alarm, means cooperative with the pressure of the fuel in the delivery line for extending a uniquely coded signal to the alarm when the pressure drops below a predetermined value in a predetermined time interval, and wherein a receiver at the alarm is receptive of the coded signal for activating the alarm.

It is another object of the present invention to provide a new and novel leak alarm system for detecting leaks in a plurality of fuel delivery lines and for identifying which of said plurality of delivery lines leak wherein the alarm system includes a remote alarm, a plurality of detectors each of which is cooperative with the pressure of the fuel in it's associated delivery line dropping below a predetermined value in a predetermined time for extending a uniquely coded signal over an interconnecting electrical power line to the alarm and wherein the alarm receptive of the coded signal becomes activated and identifies the leaking fuel line.

It is another object of the present invention to provide a leak alarm system of simplified construction which is retrofitable to existing fuel filling or bulk stations and which is reliable in operation.

It is another object of the present invention to provide a leak alarm system wherein the remote alarm may be easily moved from location to location.

It is another object of the present invention to provide a leak alarm system having means for the user to conduct a full operational integrity check.

It is another object of the present invention to provide a leak alarm system having the detection of leaks in fuel delivery lines occurring while the fuel is being pumped therethrough and during a predetermined time interval after stopping pumping.

SUMMARY OF THE INVENTION

The present invention includes a portable remote alarm typically located in the bulk or filling station building and a plurality of detectors one positioned in each dispenser of the different product lines. The detector detects a drop in the fuel delivery line when a drop exceeds a predetermined value while the fuel is flowing and within a predetermined time interval after flowing has stopped. That detection is converted into an FM and AM signal which is applied to the conventional interconnecting electrical power line to which the remote alarm is interconnected within the building. The remote alarm is portable and can be easily moved about and plugged into any of the conventional electrical power outlets found within the building. When a leak is detected, the detector issues a uniquely formed FM and AM signal over the power lines which is decoded by the remote alarm to signal an audible alarm and to light a light indicative of the identity of the leaking fuel line. A different signal is used for the different product lines.

The detector for each different product line is mounted in the dispenser and includes a pressure sensitive switch which is optically coupled with a mechanical piston thereby minimizing explosion risk and a transmitter which is responsive to a drop in pressure for applying a uniquely generated FM and AM coded signal onto the power line. The detector is activated whenever fuel is being pumped in the delivery line and within a predetermined time interval after pumping has stopped.

The portable and remote alarm includes a receiver which constantly monitors the frequencies on the electrical power line to output a warning signal to the audible and visual alarms in the event the presence of any of the unique FM and AM signals is detected.

An integrity check circuit is provided so that the operator of the filling station can interrogate the operability of the system whenever desired.

Other objects, advantages and capabilities of the present invention will become more apparent as the description proceeds taken in conjunction with the accompanying drawings.

DESCRIPTION OF THE DRAWINGS

FIG. 8 is the remaining detailed circuitry of the preferred receiver of the present invention.

FIG. 9 is a blown-apart perspective of the pressure detector of the present invention.

FIG. 10 is a cross-sectional view of the assembled pressure switch of FIG. 9.

GENERAL DESCRIPTION

Figure 1:
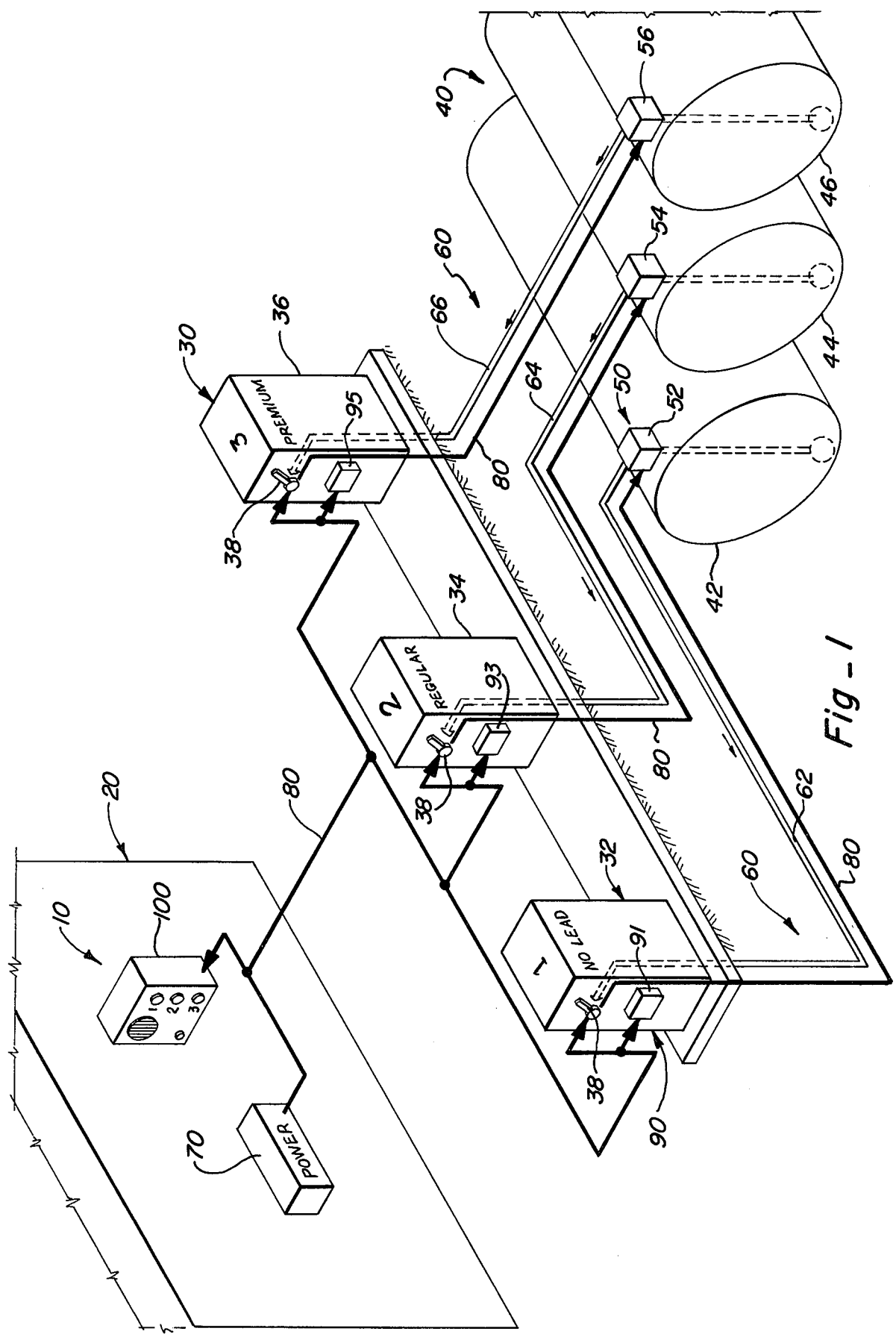
FIG. 1 is a perspective view of a bulk or fuel filling station having the fuel leak alarm system of the present invention installed therein.

The fuel leak alarm system 10 as shown in FIG. 1, is installed into a conventional fuel station 20 having dispensers 30 and storage tanks 40 wherein pumps 50 pump the fuel from the storage tanks 40 through interconnecting fuel delivery lines 60. The NO LEAD dispenser receives NO LEAD gas stored in storage tank 42 which is pumped therefrom by pump 52 and is delivered through delivery line 62. The REGULAR dispenser 35 receives REGULAR gas from storage tank 44 by means of activating pump 54 for delivery of the gas through delivery lines 64 and finally, the PREMIUM dispenser 36 receives PREMIUM gas from storage tank 46 by means of activation of pump 56 for delivery through delivery line 66.

The conventional station 20 operates in the following manner. Electrical power, such as 110 volt A.C. or 220 volt A.C., is furnished from a conventional power source 70 which may for example be a standard fuse box interconnecting with a power utility line. The power is delivered over electrical power line 80 into the NO LEAD dispenser 32, the REGULAR dispenser 34, and the PREMIUM dispenser 36. On each dispenser 30 is an on-off switch 38 which extends the power from power line 80 to the individual pumps 52, 54, and 56. Thus, when a customer desires to receive PREMIUM gas from dispenser 36, the on-off switch 38 is closed to provide power to the pump 56 thereby to commence pumping of premium gas from tank 46 and into delivery lines 66. It is expressly understood, that it is conventionally known that each of the dispensers 30 can be in operation at the same time with all of the pumps 50 pumping gas from their respective storage tanks 40 through delivery lines 60. The leak alarm system 10 of the present invention is designed to interconnect with the power delivery line 80 to not only receive power from which to operate but to utilize the lines 80 in a manner to extend signals thereover. The present invention provides in the preferable embodiment, detectors 90 located on each of the dispensers 30 for detection of a leak in delivery lines 60 and for activating an alarm 100 mounted in the station building 20. In the embodiment shown in FIG. 1, the NO LEAD dispenser 32 has detector 91 interconnected with fuel delivery line 62, while the REGULAR dispenser 34 has a detector 93 interconnected with fuel delivery line 64 for detection of a leak therein and the PREMIUM dispenser 36 has a detector 95 mounted therein interconnected with fuel delivery line 66 for detection of a leak therein. Each of the detectors 90 upon the detection of a leak in the fuel delivery line 60 transmits a signal over power line 80 which is detected by the receiver 100 to activate an alarm plus a light indicating which of the fuel lines 60 is experiencing a leak.

Figure 2:
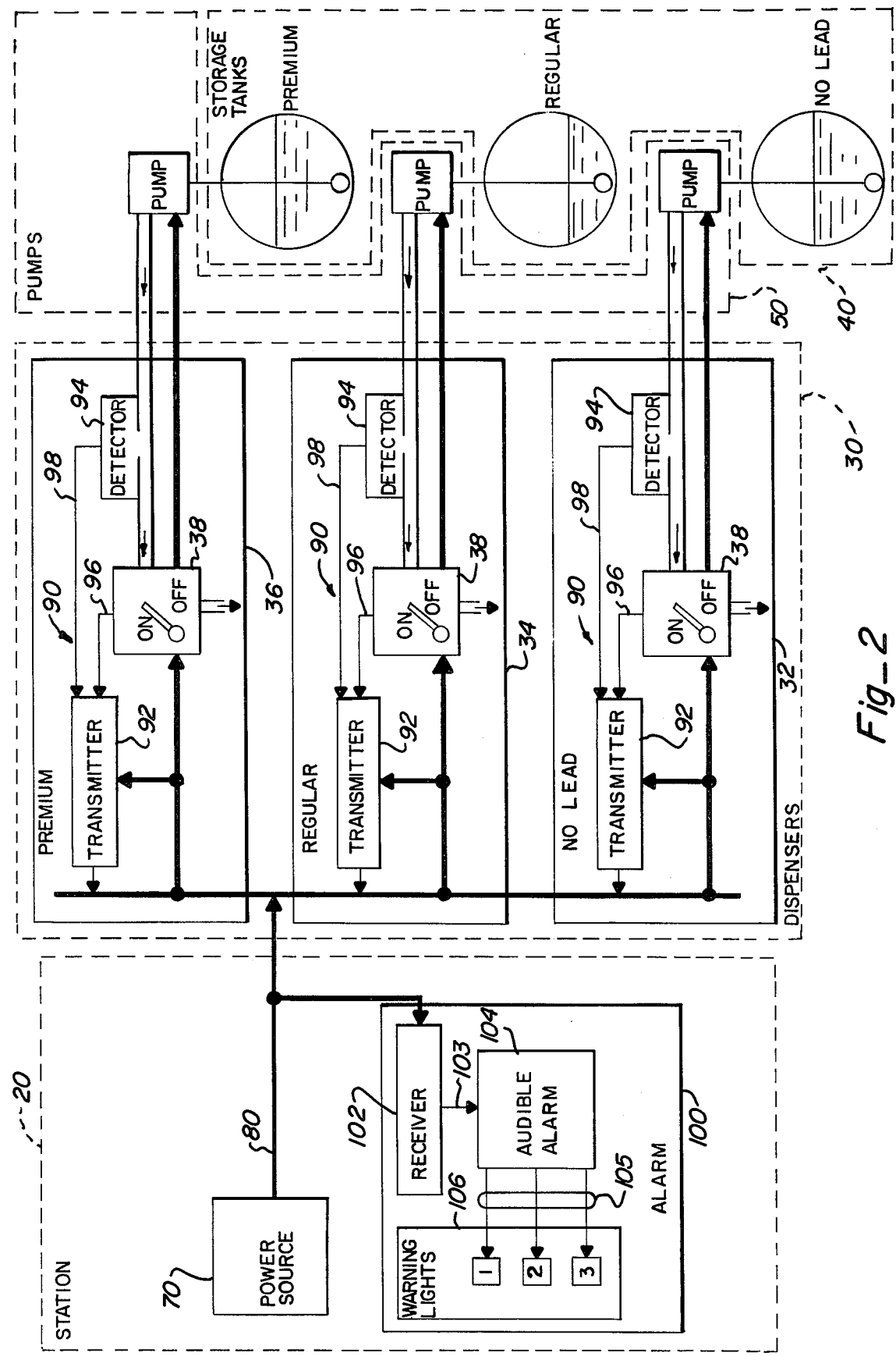
FIG. 2 is a block diagrammatic representation of the various components of the fuel leak alarm system of the present invention as shown in FIG. 1.

In FIG. 2, a diagrammatic representation of both the components of the conventional station 20 and of the leak alarm system 10 of the present invention is further disclosed. The station 20 has mounted therein power source 70 for generating AC power over line 80. Also mounted in station 20 is the alarm circuit 100 of the present invention which includes a receiver 102, an audible alarm 104, and a set of warning lights 106. The receiver 102 is interconnected with the power line 80 not only to receive electrical power therefrom but also to receive any leak signals from the detectors 90 mounted on the dispensers 30. If such a signal is detected, the receiver 102 activates the audible alarm 104 and in turn simultaneously activates the appropriate light identifying the leaking gas line 60. The power line 80 is delivered conventionally from the gas station 20 to each of the dispensers underneath the pavement or concrete. As will become apparent, the alarm 10 of the present invention is designed to retrofit to existing conventional stations 20 which already have the electrical power buried beneath the concrete or asphalt extending from the station to the dispensers. The only interconnecting wires between the gas station 20 and the dispensers 30, therefore, are the conventional already buried power lines. There are no additional interconnecting wires.

The dispensers 30 contain the NO LEAD dispenser 32, the REGULAR dispenser 34, and the PREMIUM dispenser 36. Within each dispenser 30 is the detector 90 of the present invention. Detector 90 includes a transmitter 92 and a pressure detector 94. As previously mentioned, the on-off switch 38 is activated from the off-on position thereby extending power from the line 80 to the pump 50, the pump 50 commences to pump gas from the storage tank 40 through the delivery line 60 and into the dispenser 30 for delivery into the vehicle or like. A signal is generated over lead 96 into the transmitter 92 to activate the transmitter 92 while gas is being pumped. During a predetermined time period after the on-off switch 38 is turned from on to off, lead 96 remains activated. While the transmitter 92 is active, the pressure of the line 60 is sensed by pressure detector 94 and the value of that pressure is delivered over line 98 into the transmitter 92. During pumping and the predetermined time delay, if the value of the pressure in the delivery line 60 remains at a constant value (i.e., within a predetermined tolerance), no alarm will be extended from the transmitter 92 over the power line 80 and into the receiver 102. In the event, however, a leak is discovered in the fuel delivery line 60, the detector 94 will detect that leak, extend a signal from the detector 94 to the transmitter 92 over lead 98 causing the transmitter 92 to extend an alarm signal over power line 80 which is picked off the power line 80 by receiver 102. If the alarm signal is of sufficient duration, the receiver 102, in this mode, further extends an alarm signal over lead 103 into the audible alarm detector 104 which sounds an audible alarm to the operator of the station 20. It furthermore sends the appropriate identification signal over leads 105 to the warning lights 106 in order to identify which of the delivery lines is leaking. The alarm signal must be of a sufficient duration to overcome the delay necessary when the on-off switch 38 is switched from off to on and the fuel is building up to pressure within the delivery line.

In this manner, an alarm leak system is disclosed which easily retrofits to existing conventional gas stations with buried power lines to provide both an audible and a visual indication as to which of the gas lines is leaking. While the detectors 90 are fixedly installed, the portable receiver 100 may be plugged into any power outlet within the building.

While the preferred embodiment in FIGS. 1 and 2, and throughout the ensuing drawings, illustrate a station having three dispensers, it is to be expressly understood that the present system finds application to any of a plurality of gas station configurations. A skilled mechanic, under the teachings of the present invention can adapt the hereinafter disclosed invention to any of such pluralities of gas stations. In addition, the use of NO LEAD, PREMIUM, or REGULAR product lines is not meant to limit or delimit the scope of the invention to such gases or commodities.

DETAILED DESCRIPTION

Figure 3:
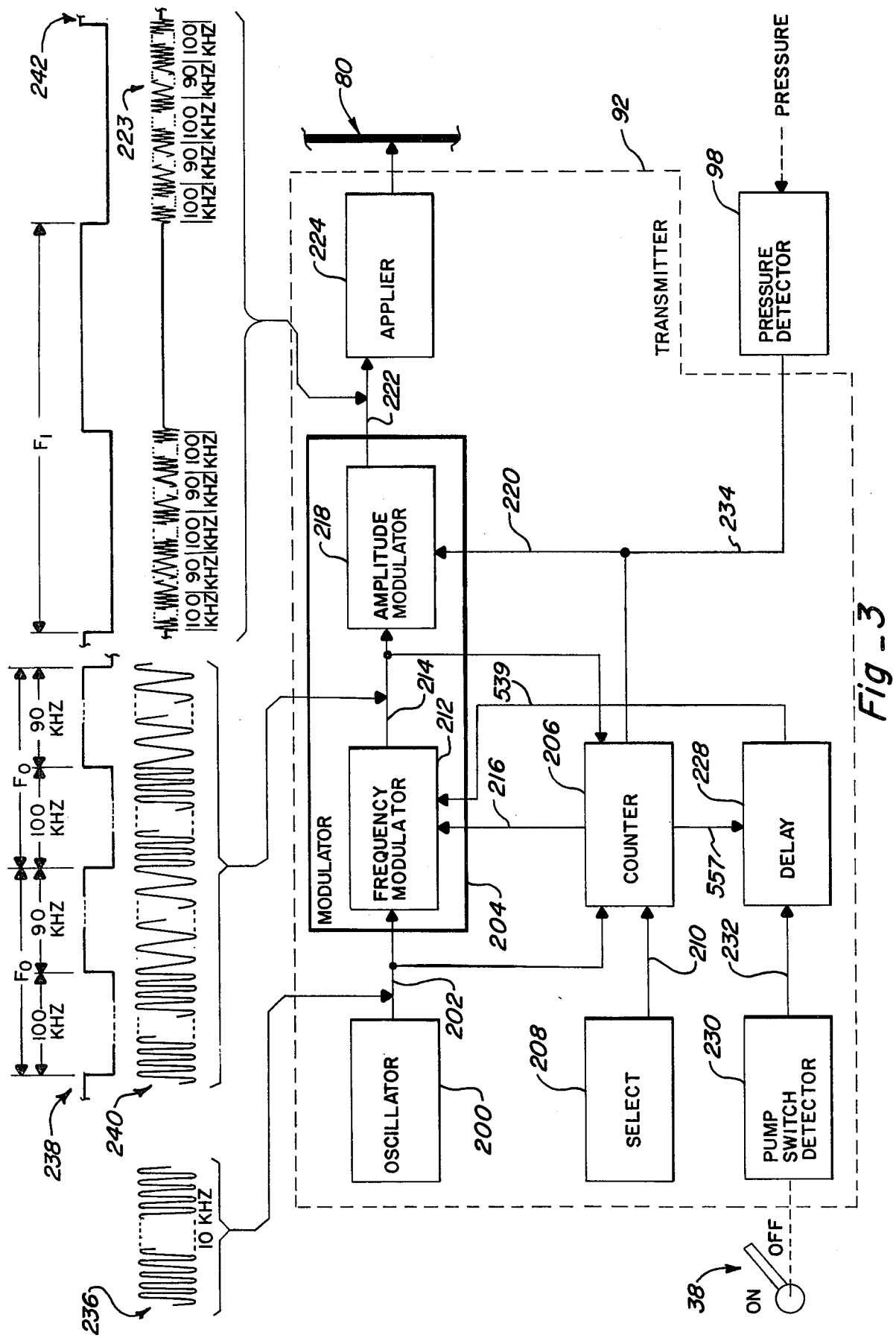
FIG. 3 is a detailed diagrammatic representation of the various components found within the transmitter of the leak alarm system of the present invention.

In FIG. 3, is a block diagram representation showing the various components and wave patterns for the transmitter 92 of the detector circuit 100 of the alarm 10 of the present invention. The transmitter 92 includes an oscillator 200 which outputs a stream of 10 KHz pulses on lead 202 for delivery into a modulator 204 and a counter 206. Also inputting into the counter 206 is a select circuit 208 which delivers input signals over lead 210 into counter 206. The oscillator 200 functions to serve the basic timing for the transmitter 92. The select circuit 208 is manually adjustable to effectuate different outputs from the transmitter 92 in accordance with the identity of the product line such as NO LEAD, REGULAR, and PREMIUM. The modulator circuit 204 receptive of the 10 KHz signal on lead 202 further includes a frequency modulator 212 which is operative on the 10 KHz signal on lead 202 to provide frequency modulation of that signal which is then placed on lead 214 for delivery into the amplitude modulator 218 and into counter 206 as is graphically represented. The frequency modulator 212 conventionally causes the frequency on lead 214 to vary at a periodic rate $F_0$ of a first 100 KHz and a second 90 KHz. The counter controls the length of each period frequency modulator 212 over lead 216 in a manner to be subsequently discussed. Suffice it to say that for each of the product lines $F_0$ is different, as will be discussed subsequently.

The output of the frequency modulator 212 over lead 214 accesses an amplitude modulator 218. The amplitude modulator 218 is under control of both the delay circuit 228 and detector 98 over lead 220. The amplitude modulator 218 in the conventional fashion further operates on the signal appearing on lead 214 to provide waveform pattern 223 shown for lead 222. The signal on lead 222 accesses the applier 224 whose function is to apply the signal appearing on lead 222 to the power line 80. The delay circuit 228 becomes activated when the on-off switch 38 is extended from the OFF to the ON position and continues for a predetermined time interval after the ON to OFF transition. In that mode, the pump switch detector 230 becomes activated to provide a signal on lead 232 thereby activating the delay circuit 228. The delay circuit 228 is turned on for the duration of pumping gas and then for a predetermined time period after stopping of the pump. If, during that turned on period, a signal is received from the pressure detector 98 over lead 234, an authorization signal is generated on lead 234 to activate the amplitude modulator 218 to receive amplitude modulation control signals over lead 220.

In operation, the transmitter 92 of the present invention becomes activated when the on-off switch 38 is extended from the OFF to the ON position thereby activating the delay circuit 228 to extend an authorization signal if a fall in pressure occurs during the pumping of gas or during a predetermined time period thereafter. If such a fall in pressure does occur during this time, an authorization signal is delivered over lead 234 to activate the amplitude modulator 218 to supply a signal appearing on lead 222 to the power line 80. Whenever the transmitter 92 is activated, the oscillator 200 and the modulator circuit 204 in cooperation with the counter 206 and the select circuitry 208 always generate an FM signal shown on lead 214. It is only when the pressure detector 98 detects a fall in pressure in the delivery system 60 that an authorization signal is applied over 234 to authorize the delay 228 to supply an amplitude modulated signal to the amplitude modulator 218. In that event, the combined FM and AM signal is delivered into the applier 224 for application of the combined FM and AM signal to power line 80. After the pumping of gas has stopped and after the predetermined delay 228 has timed out or if no such fall in pressure is sensed, no signal is applied to the power line 80 by the applier 224.

The following is a discussion of the waveforms generated by the various functional components shown in FIG. 3. Wave 236 represents the 10 KHz signal appearing on lead 202 from oscillator 200. That signal enters the frequency modulator 212 which is also receptive of a square wave signal 238 appearing on lead 216. The square wave signal appearing on lead 216 periodically goes from a low to a high back to a low. Whenever the signal appearing on lead 216 is low, the output from the frequency modulator 212 on lead 214 is a 100 KHz signal. Whenever the output on lead 216 is high, the output on lead 214 from the frequency modulator is a 90 KHz signal. In this manner, the waveform 240 is generated on lead 214 switching from 100 KHz signal to a 90 KHz signal and back again at a frequency of $F_0$. This frequency modulated or FM signal appearing on lead 214, as mentioned, is delivered into the amplitude modulator 218. The amplitude modulator 218 is under control of a signal appearing on lead 220. That signal is represented by square wave 242 when a leak is being detected. Waveform 242 appears on lead 220 and also periodically changes from a high to a low and back to a high state at a frequency of $F_1$. Whenever the signal on lead 220 is low, the signal from the frequency modulator 212 appearing on 214 is extended through the amplitude modulator 218 to lead 222 and thence to the power line 80 by the applier 224. Whenever the signal appearing on lead 220 is high, however, the signal appearing on lead 214 from the frequency modulator 212, is not extended through to lead 222. In this manner, the frequency modulated signal is amplitude modulated. The combined frequency and amplitude modulated signal is now applied to the power line 80 and represents a unique identity signal that is delivered into the receiver 100 of the alarm system 10 of the present invention. If no leak is detected, the detector 98 prevents the application of waveform 242 to the amplitude modulator 218.

Figure 4:
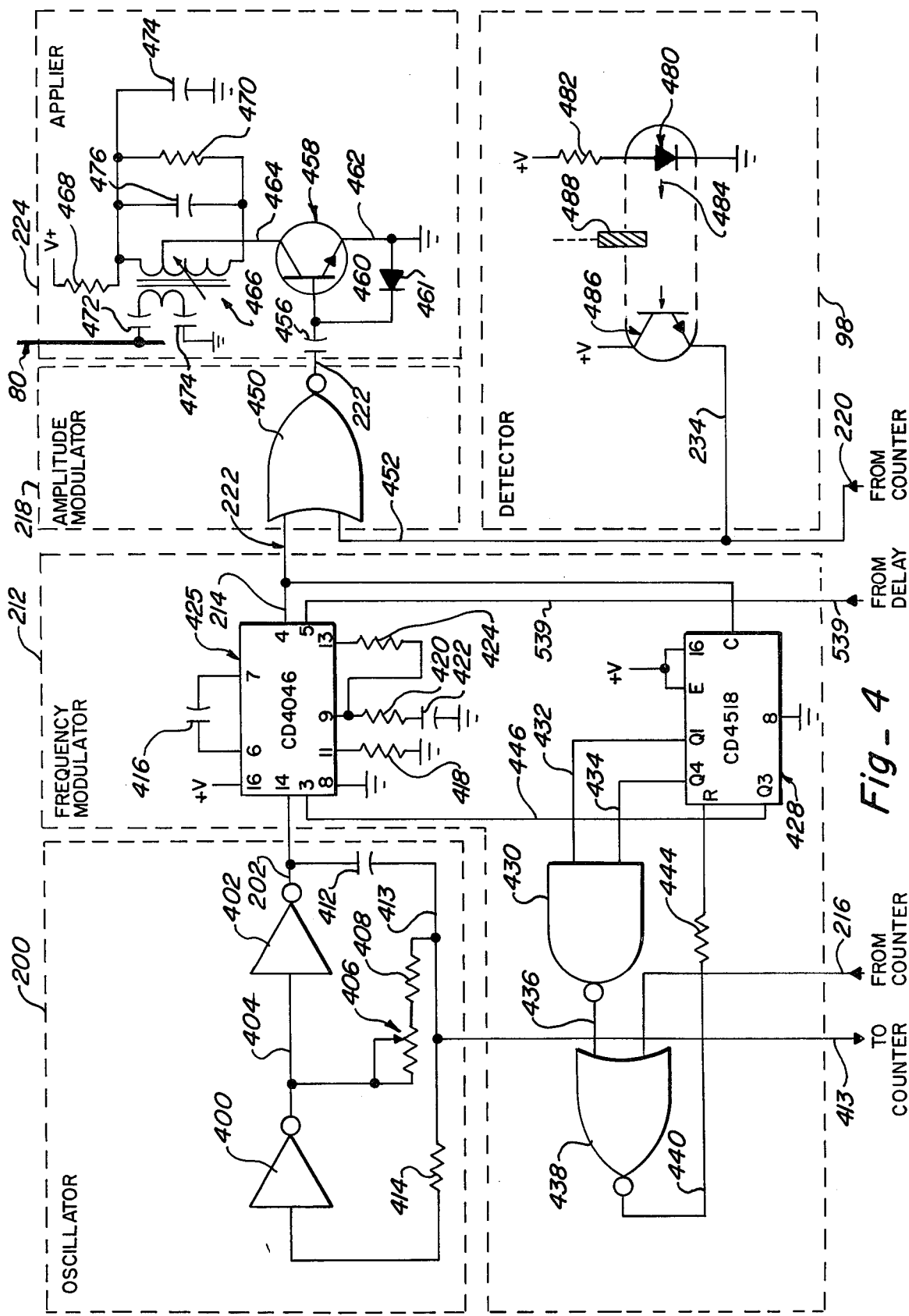
FIG. 4 shows the detailed construction of one preferred embodiment of the electronics found in part of the transmitter of the present invention.

In FIG. 4 is shown one preferred embodiment of the detailed electronic circuitry for the oscillator 200, the modulator 204, the detector 98, and the applier 224.

The oscillator 200 may comprise any conventional oscillator which is capable of delivering a 10 KHz output. The circuitry shown in FIG. 4 for oscillator 200 includes two inverters 400 and 402 wherein the output of the first inverter 400 is interconnected over lead 404 to the input of inverter 402 and the output 404 is further interconnected to a potentiometer or adjustable resistor 406 which is interconnected in series with a fixed resistor 408. The output of inverter 402 appearing on lead 202 is delivered through a capacitor 412 to one end of fixed resistor 408 and is further connected in series with resistor 414 to the input of inverter gate 400. Typical values for the components are:

Resistor 406 — 0.01 megohms
Resistor 408 — 0.02 megohms
Resistor 414 — 0.1 megohms
Capacitor 412 — 1,000 pF The frequency modulator 212 receives an input from the oscillator 200 over lead 202 which is directed into a phase-lock loop digital integrated circuit chip such as that manufactured by RCA as Model No. CD4046. The pin designation reference numbers shown are those for that chip. Between pins 6 and 7 is connected a capacitor 416. Pin 8 is connected to ground. Pin 11 is connected through a resistor 418 to ground and pin 9 is connected through a resistor 420 and capacitor 422 to ground while the output of pin 9 is further connected through a resistor 424 to pin 13. The output of pin 4 is connected over lead 214 to the C input of a digital binary counter integrated circuit chip 428 manufactured by RCA as chip No. CD4518. Pin 16 and the E input of the chip 428 are connected to positive voltage. The outputs $Q_1$ and $Q_4$ are delivered from chip 428 into a NAND-gate 430 over leads 432 and 434. The output of NAND-gate 430 is delivered over lead 436 into a NOR-gate 438. The output of NOR-gate 438 is delivered over lead 440 through a resistor 444 and into the R input of chip 428. The $Q_3$ output of chip 428 is delivered over lead 446 into pin 3 of chip 425. NOR-gate 438 receives the FM modulate control signal from the counter 206 over lead 216. Typical values for the various components of the modulator circuit 204 are:

Resistor 418 — 0.27 megohms
Resistor 420 — 0.001 megohms
Capacitor 422 — 1 uF
Resistor 424 — 0.01 megohms
Resistor 444 — 0.27 megohms
Capacitor 416 — 33 pF The amplitude modulator 450 comprises a NOR-gate 450 having one input over lead 214 from the frequency modulator 212 and a second input over lead 220 from the delay circuit 228. An output is delivered over lead 222 to the applier 224.

The applier 224 includes the following components. The output of the NOR-gate is delivered over lead 224 through a series connected capacitor 456 and into the base of transistor 458 over lead 460. Lead 460 is also delivered through the reverse bias of diode 461 which is connected to ground. The emitter of transistor 458 is also grounded over lead 462. The collector of transistor 458 is delivered over lead 464 to the transmitter side of an isolation coil 466. The transmitter side of the isolation coil 466 is further connected at one end through resistor 468 to positive voltage and the other end of which is connected through a parallel resistor 470, capacitor 476 combination back to the other side of the coil. The first input is further connected through capacitor 474 to ground. The power line side of the isolation coil 466 is interconnected through capacitor 472 to the power line 80. The opposing end of the lined side of the coil 66 is interconnected through an identical capacitor 472 to ground. The values for the various components in the applier circuit 224 are:

Capacitor 456 — 150 pF
Transistor — MPSA20
Diode — 1N914
Resistor 468 — 100 ohms
Resistor 470 — 330 ohms
Capacitors 472 — 0.1 uF
Capacitor 474 — 0.01 uF
Capacitor 476 — 3,900 pF The components of the detector circuit 98 will now be discussed. A light emitting diode 480 is biased through resistor 482 to positive voltage. Light 484 is directed into a photocell 486 which is also biased from ground through leads 234 and 220 to one input of NOR-gate 450 of the amplitude modulator 218. In the event that pressure in the system is normal (i.e., no leakage), a mechanical plunger 488 will break the beam of light path 484 causing the photocell 486 to be in the OFF condition, or that of a high resistance state. In the event that leakage occurs in the predetermined time interval as will be subsequently discussed, the plunger 488 is retracted and light 484 saturates the photocell 486 thereby producing a ground signal indication on lead 234. In the preferred application, resistor 482 is 0.0033 megohms.

Figure 5:
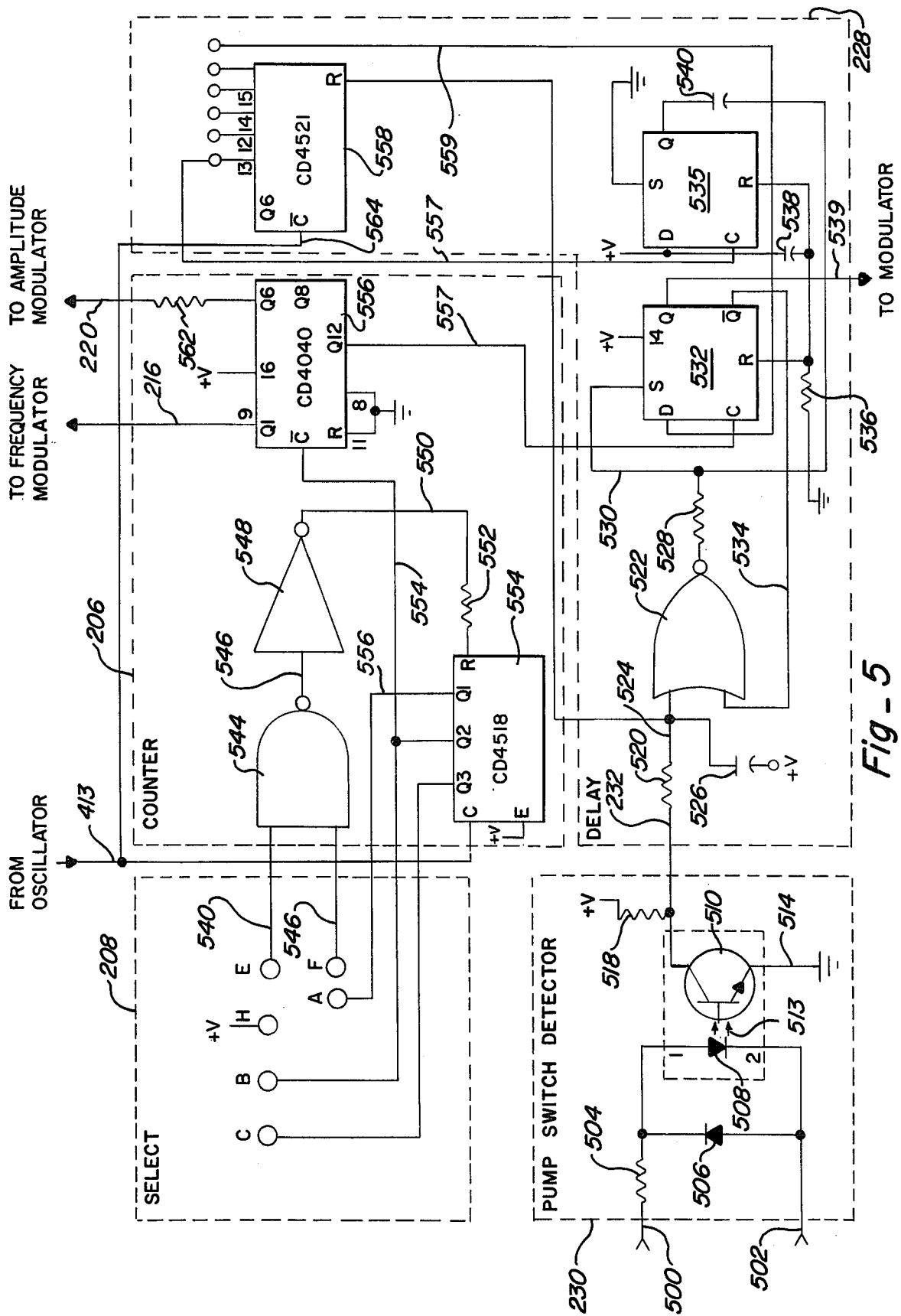
FIG. 5 shows the detailed electronic circuitry for the remaining part of the transmitter of the preferred embodiment shown in FIG. 4.

In FIG. 5, is shown the preferred electronic embodiment of the select circuitry 208, the counter 206, the pump switch detector 230, and the delay circuit 228.

The pump switch detector 230 receives inputs 500 and 502 from the on-off switch 38. Input 500 is delivered through resistor 504 and into reverse biased diode 506 and a light emitting diode 508. The light emitting diode 508 emits a beam of light into the base of transistor 510. The emitter of the transistor 510 is connected over lead 232 through resistor 518 to positive voltage. Typical values for the pump switch detector 230 are:

Resistor 504 — 0.027 megohms
Diode 506 — 1N914
Resistor 518 — 0.027 megohms

The delay circuit 288 is interconnected with the pump switch detector 230 over lead 232. Lead 232 accesses a resistor 520 which is delivered to one input of NOR-gate 522 over lead 524. Lead 524 is also delivered through a capacitor 526 to ground. The output of NOR-gate 522 is delivered into a resistor 528, whose output is interconnected over lead 530 to flip-flop 532 at the set input. The $\bar{Q}$ output of flip-flop 532 is delivered over lead 534 into the remaining input to the NOR-gate 522. The reset input R of flip-flop 532 is grounded through resistor 536. Furthermore, a second flip-flop 535 is provided in the delay circuit wherein the D input of flip-flop 535 is connected to positive voltage which is further connected through the series connection of capacitor 538 and resistor 536 to ground. The reset input R of flip-flop 535 is further connected through resistor 536 to ground. The S input of flip-flop 535 is also connected to ground. The Q output of flip-flop 535 is connected through capacitor 540 to lead 530. The clock input C of flip-flop 535 is interconnected over lead 537 to pin 13 of a ripple counter integrated circuit chip 558. Chip 538 is incremented by signals appearing on lead 413 at the $\bar{C}$ input. A jumper connection is provided from lead 559 to any one of a plurality of outputs from chip 558. Typical values for the various components in the delay circuit 228 are:

Resistor 520 — 0.27 megohms
Capacitor 526 — 1 uF
Resistor 528 — 0.27 megohms
Resistor 536 — 0.27 megohms
Capacitor 538 — 1 uF
Capacitor 540 — 0.01 uF The select circuit 208 can comprise any conventional select means including selector switches, preprogrammable memory, etc. In the preferred embodiment shown in FIG. 5, the selection is made by an installer through means of various jumpers between a plurality of points. The following table illustrates such choices:

| Product Line | Jumpers | FM $f_0$ | AM $f_1$ |
|---|---|---|---|
| PREMIUM | A-F, B-E | 1666 Hz | 52.08 Hz |
| REGULAR | C-F, F-H | 1250 Hz | 39.06 Hz |
| NO LEAD | A-F, C-E | 1000 Hz | 31.25 Hz |

The counter 206 receives various inputs from the select circuitry 208. The E select is delivered over lead 540 into one input of NAND-gate 544. The F select is delivered over lead 546 into the remaining input of NAND-gate 544. The output of NAND-gate 544 is delivered over lead 546 into an inverter gate 548. The output of the inverter gate 548 is delivered over lead 550 through resistor 552 and into the reset input R of an integrated circuit chip 554 which is a conventional dual decade counter (such as CD4518). The A select of selector 208 is delivered over lead 556 to the $Q_1$ input of chip 554, the B select input of select 208 is delivered over load 554 to the $Q_2$ input. Furthermore, the B select is delivered over the 554 input to the $\bar{C}$ input of chip 556. The C select is delivered to the $Q_3$ input of chip 554. The C input of chip 554 is received from the oscillator 200 over lead 413. Chip 556 is a 12-stage ripple counter conventionally made by RCA as chip No. CD4040. Pins 8 and 11 of chip 556 are grounded, the $Q_{12}$ output is delivered over lead 557 into the clear input C of flip-flop 532. The $Q_1$ output of chip 556 is delivered over lead 216 to the remaining input of NOR-gate 438 in the modulator 204. Output $Q_6$ of chip 556 is delivered through resistor 562 to lead 220 which accesses one input of gate 450 of the amplitude modulator 218.

The operation of the transmitter shown in FIGS. 3, 4, and 5 will now be discussed. As previously discussed, the frequency modulator 212 in cooperation with oscillator 200 provides a signal on lead 214 as shown by waveform 240 in FIG. 3 only if a turn-on signal is present on lead 539. If the signal on lead 539 is low, the signal is extended from chip 425 onto lead 214. If, however, the signal is high on lead 539, then no $F_0$ signal is extended from the chip 425 to lead 214.

Whether or not the uniquely coded signal having frequencies of $F_0$ and $F_1$ appears on lead 222 from the amplitude modulator 218 for delivery into the applier 224, depends on the voltage wave appearing on lead 220. The values of $F_0$ and $F_1$ as presented in the above table can vary depending upon the product line selected. The interconnection of the various jumpers in select circuit 208 merely provides the counter 206 to output different control $F_0$ and $F_1$ frequencies to the modulator 204. The output of chip 556 appearing on lead 216 delivers wave pattern 238 on lead 216 to the frequency modulator 212 while the output of chip 556 appearing on lead 220 delivers wave pattern 242 to the amplitude modulator 218 only when the detector 98 on lead 234 so authorizes. Therefore, the installer can appropriately select which jumpers to interconnect to provide a uniquely coded $f_0$ and $f_1$ signal for that particular product line.

It becomes apparent that the only time the frequency modulator 212 should be activated or turned on by a low signal on lead 539 is during that time period when signals can be transmitted over power line 80 to the receiver 102 (i.e., when the pump switch is turned from the OFF to ON position to allow gas to flow and for a predetermined time interval after the handle has been turned back from the ON to the OFF position). At all other times, the signal on lead 539 should be high in order to turn the modulator 212 off. Furthermore, the authorization signal appearing on lead 234 from the detector 98 to the applier 224 should only authorize the application of the combined $f_0$ and $f_1$ signal appearing on lead 222 to the power line 80 when a fall in pressure is detected by detector 98. Thus, we have two conditions that must be met before a signal can be applied to power lines 80 — viz. (1) a low condition appearing on lead 539 and (2) a low signal appearing on lead 234 from the detector 98. The low signal on lead 234 is ORed with the amplitude modulation control signal 242 appearing on lead 220 and permits amplitude modulation to occur.

The low condition for lead 539 is created as follows. When the switch pump handle 38 goes from the OFF to the ON position, light 518 from the photocell 508 is prevented from entering the photo transistor 510. In this mode, a high is applied to lead 524 of NOR-gate 522 and to the reset lead of counter 558. The high appearing on the reset lead R of counter 558 inhibits the counter 558 from being activated. Therefore, all outputs of the counter 558 are low including the output on pin 13 to the C input of gate 533. Furthermore, the output over lead 559 is also low and that low indication is delivered to the D input of flip-flop 532. It is to be expressly understood that the clock signals appearing over lead 557 from counter chip 556 continually provides a clocking pulse to gate the value of D to the Q output. Therefore, since the value at this time for D is low, the next clock pulse will produce a low output from flip-flop 532 at Q onto lead 539. As previously mentioned, whenever the signal appearing on lead 539 is low, the frequency modulator 212 is activated to produce pulses at its output on lead 214 shown by wave 240. Therefore, when the pump switch handle 38 is moved from the OFF to the ON position and gas is being pumped, the counter 558 is reset and flip-flop 532 delivers a low condition over lead 539 to turn on the modulator 204.

When the switch handle 38 is turned from the ON to OFF position to stop the flow of gas, the photo transistor 510 becomes saturated producing a low signal on lead 524. The low signal is immediately delivered to the R input of counter 558 to enable the counter 558 to start counting. When an appropriate delay is selected by putting a jumper between lead 559 and one of the outputs of the counter 558, a delay varying from one second to several minutes may be effectuated. When the counter 558 reaches the preselected delay, a high signal is generated on lead 559 which is delivered to the D input of flip-flop 532. The next clock pulse on input C of 532 causes the output Q to become high and the output of $\overline{Q}$ to be low. As mentioned, whenever the signal on lead 539 to the modulator 204 becomes high, the modulator is prevented from producing signals on lead 222. Therefore, after the switch handle has been extended from the ON to the OFF position, a predetermined time delay as determined by the extended jumper between lead 559 and one of the outputs of chip 558 must time out before signal to the frequency modulator 212 goes high thereby preventing the modulator 212 from becoming activated. Before the predetermined time delay times out, the signal appearing on lead 559 is low, but the gas flow has stopped. That low is delivered to the D input of flip-flop 532 and is delivered through the Q output of flip-flop 532 as a high to hold the output of gate 522 low. However, when the signal on lead 559 becomes high when the predetermined time interval is reached, lead 599 becomes high and $\overline{Q}$ from flip-flop 532 becomes low. The appearance of two lows at the input to NOR-gate 522 causes the output to go high, thereby causing the flip-flop 532 to be in the set condition locking it into the fixed state until the next OFF to ON transition.

The generation of the authorization signal from the detector 98 appearing on lead 234 ORed with the amplitude control signal appearing on lead 220 which comprises the second condition necessary for transmitter on error signal over the power line 80 will now be discussed. The operation of the detector will be presented later, suffice it to say that a high condition appears on lead 234 when the pressure in the fuel delivery line is normal and a low appears when a leak is detected. Due to the ORing of signals from the $Q_6$ output of chip 556 which produces the $f_1$ amplitude control signal with the authorization signal on lead 234, NOR-gate 450 only becomes activated to produce the combined FM and AM signal when a leak is sensed.

In summary, during the time period extending from an OFF to ON transition of handle 38 (gas flowing) to a predetermined time interval after the ON to OFF transition (no gas flow), the FM wave signal 238 appears on lead 214 at the input to NOR-gate 450. If no leak is detected, lead 220 is held high by the detector 98 so that the output of NOR-gate 450 is low. If a leak is detected, lead 220 is authorized by the detector 98 to carry the AM control signal 242 thereby effectuating a combined FM and AM modulated signal at the output of NOR-gate 450.

An integrity check for the transmitter 92 is also provided. When the pumps 50 at the storage tanks 40 are turned off at the tanks, no gas can flow in the delivery lines. When power is turned on to the alarm system, for example at the start of the day, capacitor 526 extends a high pulse to chip 558 to reset the counter. Furthermore, flip-flops 532 and 533 are both reset by capacitor 538. At this time, a low signal is delivered over lead 539 and the frequency modulator 212 is turned on. Since the pressure of the fuel in the delivery line is zero, the detector 98 senses a pressure leak and lead 234 is low therefore allowing NOR-gate 450 to output the combined FM and AM error signal. Therefore, the alarm 100 in the station will sound. If the transmitter or receiver is malfunctioning, the alarm will not sound. This provides a full integrity check of the system by the operator. The error signal, however, will be generated only for a brief interval since when pin 13 of chip 558 goes high, this combination is extended to the Q output of flip-flop 533 and further to the set input S of flip-flop 532 which in turn causes lead 539 to go high thereby deactivating the frequency modulator 212.

Figure 6:
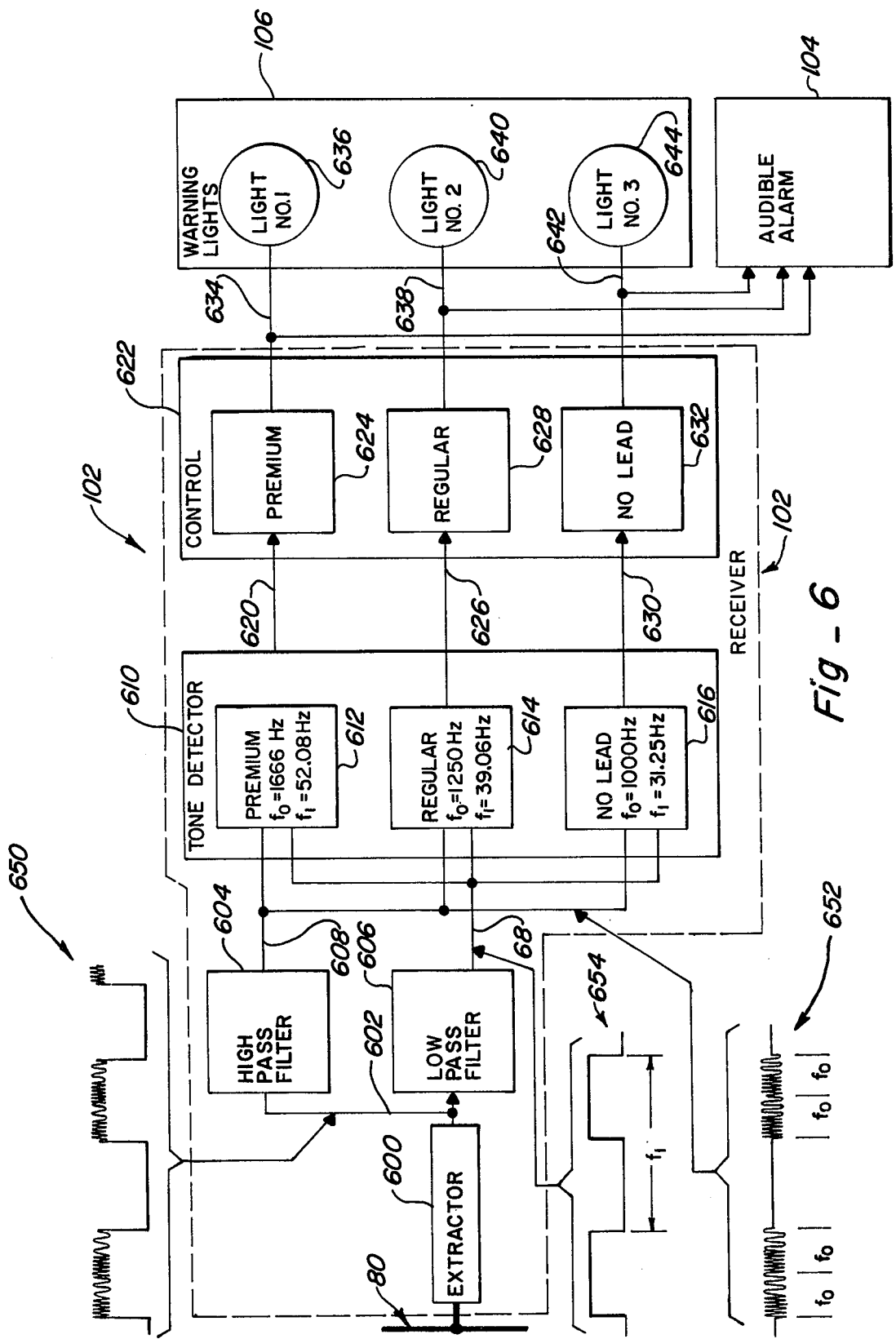
FIG. 6 is a detailed diagrammatic representation of the various components found within the receiver of the leak alarm system of the present invention.

The alarm circuit 100 mounted in the station 20 is shown in FIG. 6 in diagrammatic form to include the receiver 102, the warning lights 106, and the audible alarm 104. The details of one preferred embodiment of these components will now be discussed.

The extractor circuit 600 is interconnected with the power line 80 to extract any signals appearing thereon from the transmitters 92 located at the various dispensers 30. The output of the extractor is delivered over lead 602 to input a high pass filter 604 and a low pass filter 606. The output of the high pass filter 604 is delivered over lead 608 into the tone detector circuit 610 which includes a tone detector 612 for the PREMIUM product line, a tone detector 614 for the REGULAR product line, and a tone detector 616 for the NO LEAD product line. Lead 608 from the high pass filter 604 accesses each of the tone detectors 612, 614 and 616. The output of the low pass filter 606 is delivered over lead 618 into the PREMIUM tone detector 612, the REGULAR tone detector 614, and the NO LEAD tone detector 616. The output of the PREMIUM tone detector 612 is delivered over lead 620 into the control circuit 622, specifically the PREMIUM control circuit 624. The output of the REGULAR tone detector 614 is delivered over lead 626 into the REGULAR control circuit 628, and the output of the NO LEAD tone detector 616 is delivered over lead 630 into the NO LEAD circuit 632. The output of the PREMIUM control circuit 624 is delivered over lead 634 into warning light number one 636 of the warning light circuits 106. The output of the REGULAR control circuit 628 is delivered over lead 638 into light indicator number two 640 of warning lights 106 and, the output of the NO LEAD control circuit 642 is delivered into light indicator number three 644. All of the outputs 634, 638, and 642 are also delivered into the audible alarm circuit 104.

The operation of the alarm circuitry shown in FIG. 6 will now be discussed. The extractor circuit 600 is interconnected with the power line 80 and responds to signals placed thereupon by the transmitter 92 located in the various dispensers 30. If any of the transmitters 92 on any of the dispensers 30 transmits a signal and applies it onto the power line 80, the extractor circuit 600 removes that signal and delivers it onto lead 602 as shown in FIG. 6 as waveform 650. The high pass filter 604 permits only the high frequencies to be extended through to lead 608 as shown by graph 652. The low pass filter 606 permits only the low frequencies to be outputted onto lead 618 as represented by waveform 654. Essentially the operation of the high pass filter 604 and low pass filter 606 is to separate out the FM components (i.e., the high frequency) from the AM components (i.e., the low frequency). The FM and AM frequency components, $f_0$ and $f_1$, are now delivered over lead 608 and 618 into the tone detector circuit 610. As previously discussed, each of the product lines has a different FM frequency and a different AM frequency. The purpose of the tone detector circuit 610 is to separate the different unique codes appearing on leads 608 and 618. Therefore, for a given waveform input 650, only one of the detectors 612, 614 and 616 will become activated. The activation signal is then delivered into the control circuit 622 which activates the appropriate warning light 106 and sounds an audible alarm 104 after a predetermined time has elapsed.

Figure 7:
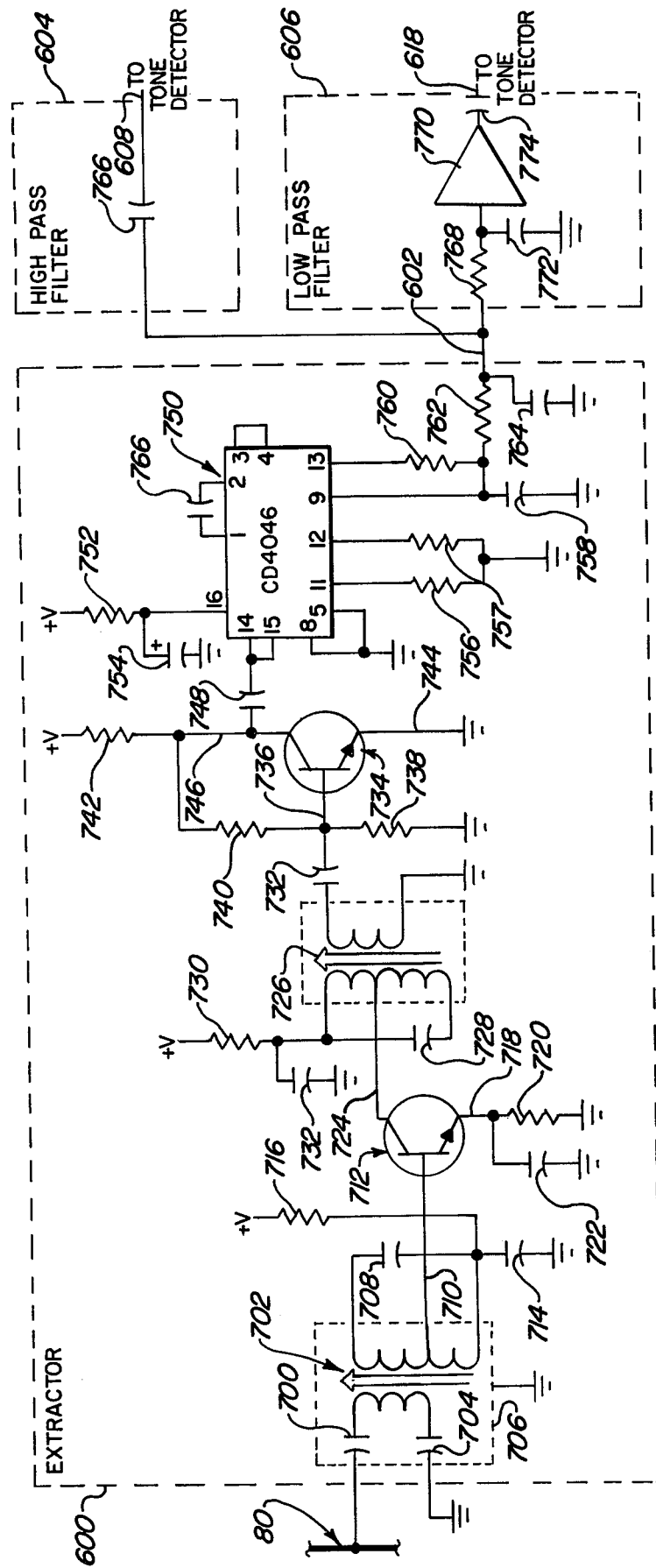
FIG. 7 shows the detailed electronic construction for part of one preferred embodiment of the receiver of the present invention.

In FIG. 7 is shown one preferable electronic circuit for the extractor 600, the high pass filter 604, and the low pass filter 606. The extractor receives an input from the power line 80 through capacitor 700 which is connected in series to one side of a line isolation coil 702. The remaining end of the line side of coil 702 is connected in series with capacitor 704 to ground. The isolation coil 702 is mounted in a shielded box 706 which is grounded. The extractor side of the isolation coil 702 has both ends of the coil connected in series through a capacitor 708. The other end of capacitor 708 is connected in series with capacitor 714 to ground. The node between capacitors 708 and 714 is connected through resistor 716 to positive voltage. A tap is provided from the coil to the base of a transistor 712. The emitter of transistor 712 is interconnected over lead 718 to the parallel resistor 720-capacitor 722 combination which is interconnected with ground. The collector of transistor 712 is connected over lead 724 to a tapped position in a second isolation coil 726. The opposing ends of the coil 726 are interconnected in parallel with a capacitor 728 in which one end of the capacitor is connected to a series resistor 730 and is biased to a positive voltage and further connected to a capacitor 732 through to ground. The isolated side of the coil 726 has one end connected to ground and the remaining end connected in series with capacitor 732 to the base of transistor 734 over lead 736. Lead 736 is also connected in series with resistor 738 to ground and is further interconnected with resistor 740 to the collector of transistor 734 and in series with resistor 742 to a positive voltage. The emitter of transistor 734 is connected over lead 744 to ground. The collector of transistor 734 is further connected over lead 746 through a series capacitor 748 to the inputs 14 and 15 of a phase locked loop integrated circuit 750. The phase locked loop circuit 750 is identical to the phase locked loop chip 425 found in the transmitter. Pin 16 of the chip 750 is connected in series to positive voltage through resistor 752 and is further connected through capacitor 754 to ground. Pins 5 and 8 are connected to ground. Pin 11 is connected through resistor 756 to ground and pin 12 is connected through resistor 757 to ground. Pin 9 is connected through capacitor 758 to ground and is further connected back through resistor 760 to pin 13 and is further connected through resistor 762 to capacitor 764 and thence to ground. Pins 3 and 4 are interconnected. Pins 1 and 2 are interconnected through capacitor 766. The extractor circuit 600 may include the following typical values:

| Capacitor 708 | 3,300 pF | Resistor 742 | .001 megohms |
| Capacitor 714 | .01 uF | Capacitor 748 | .01 uF |
| Resistor 716 | .01 megohms | Resistor 752 | 270 ohms |

-continued

| | | | |
|---|---|---|---|
| Resistor 720 | .001 megohms | Capacitor 754 | 1 uF |
| Capacitor 722 | .01 uF | Capacitor 766 | 1,000 pF |
| Capacitor 728 | 3,300 pF | Resistor 756 | .0082 megohms |
| Resistor 730 | 100 ohms | Resistor 757 | .01 megohms |
| Capacitor 732 | .01 uF | Resistor 760 | .01 megohms |
| Capacitor 732 | 150 pF | Capacitor 758 | .01 uF |
| Resistor 738 | .01 megohms | Resistor 762 | .001 megohms |
| Resistor 740 | .027 megohms | Capacitor 764 | .05 uF |

The operation of the extractor is conventional and may include any number of filtering stages.

The output of the extractor 600 is delivered over lead 602 which is delivered to the high pass filter 604 which comprises capacitor 766. Capacitor 766 is preferably 0.01 uF. The output of capacitor 766 is delivered to the tone detector 610 over lead 608.

The low pass filter 606 is further interconnected to the extractor circuit 600 over lead 602. Leak 602 accesses resistor 768 and is delivered into operational amplifier 770. The input to the operation of amplifier 770 is further connected through a capacitor 772 to ground. The output of the operational amplifier is delivered into a capacitor 774 which is connected to lead 618 for interconnection with the tone detector 610. The preferred values for the various components in the low pass filter 606 are:

Resistor 768 — 0.1 megohms
Capacitor 772 — 1 uF
Capacitor 774 — 1 uF

In FIG. 8 is shown a preferred embodiment of the electronic construction of the tone detectors 610, the control circuits 622, the warning lights 106, and the audible alarm 104. There are three sets of tone detectors 612, 614, and 616. Each set is identical to each other set and includes two integrated circuit tone detectors preferably those manufactured by SIGNETICS as Model No. NE567V. For example, in the set of tone detectors 612 for the PREMIUM product line, the first integrated tone detector 800 is designed to detect an $f_0$ tone appearing on lead 608 of 1,000 Hz. At the appearance of such a tone on lead 608, the tone detector 800 issues an output signal on lead 804. Interconnected with the tone detector 800 are conventional resistors and capacitors interconnected to modify the tone detector 800 to detect a 1,000 Hz signal on lead 608. The output signal delivered on lead 804 is interconnected with a resistor 806 to positive voltage and is further delivered into one input of NOR-gate 808. The second input to NOR-gate 808 is from tone detector 802 on lead 810. Tone detector 802 is interconnected to lead 618 and issues a signal on lead 810 only when a signal of precisely 31.25 Hz appears on lead 618. Once again, the various interconnecting resistors and capacitors are designed to modify tone detector 802 to precisely detect a 31.25 Hz signal. The output of NOR-gate 808 becomes active only when both tone detectors 800 and 802 detect their frequencies so that leads 804 and 810 are both low and are delivered on lead 812 to a parallel connection of a reverse biased diode 814 and a resistor 816, the other ends of which are interconnected in series with capacitor 818 to positive voltage. The resistor 816 and the capacitor 818 form an RC time constant so that the alarm signal must occur in a predetermined length of time before any signal will be extended to the lead 620. The output of the tone detector 612 is delivered over lead 620 into the PREMIUM control circuit 624 and more specifically into NOR-gate 820. The output of NOR-gate 820 is delivered over lead 822 to one input of NOR-gate 824. The output of which is delivered over lead 826 to the remaining input of NOR-gate 820. Furthermore, the remaining input to NOR-gate 824 is delivered over lead 830 from a reset circuit 832.

The reset circuit 832 includes a push-button switch 834 one end of which is connected to positive voltage and the other end of which is connected to lead 830 and to resistor 836 which is interconnected with ground.

The light indicator circuit 636 is interconnected with the PREMIUM control circuit 624 over lead 634. Lead 634 accesses an operational amplifier 840 the other input of which is biased through resistor 842 to positive voltage and is further biased through resistor 844 to ground. The output of the operational amplifier 840 is delivered over lead 846 into resistor 848 and light indicator 850 to positive voltage. The values of the preferred components are:

Resistor 842 — 0.01 megohms
Resistor 844 — 0.01 megohms
Resistor 848 — 270 ohms

The audible alarm circuit 104 is interconnected with the PREMIUM control circuit 624 also over lead 634 which specifically accesses NOR-gate 860. The output of NOR-gate 860 is delivered over lead 862 into inverter 864. The output of inverter 864 is delivered over lead 866 into the base of transistor 870. The emitter of transistor 870 is connected through resistor 872 to ground while the collector of transistor 807 is delivered to an audible alarm circuit 874 as that conventionally made by SONALERT.

The operation of the circuitry in FIG. 8 will now be described. Assume, for example, that a leak is detected in the PREMIUM product line delivery system. As previously discussed, when that occurs, a 1000 Hz signal is placed on lead 608 and a 31.25 Hz signal is placed on lead 618. In that event, tone detectors 800 and 802 deliver a low signal on leads 804 and 810. With both inputs to the NOR-gate 808 low, the output on lead 812 goes high. Now the flip-flop circuit comprising gates 820 and 822 are normally reset, that is push-button switch 834 has been pushed and released which, after releasing, effectuates the following states to be present. The input to gate 824 on lead 830 is low, the input to gate 824 on lead 822 is high, the output from gate 824 on lead 826 is low, and the input to gate 820 on lead 620 is normally low. As mentioned, when tones of 1,000 Hz and 31.25 Hz are detected, the output of gate 808 on lead 812 goes high, only after a predetermined RC time has elapsed. This high is extended over lead 620 to gate 820. The high at the input to gate 820 causes the output to go low, both inputs to gate 824 are now low effectuating a high output on lead 826. The high output on lead 826 is fed back into NOR-gate 820 to latch NOR-gate 820 into the low output state. Therefore, the high remains on lead 826 which is also extended over lead 634 into the light circuit 636 to activate the lamp 850 and which is further extended into NOR-gate 860 of the audible alarm circuit to sound the SONALERT alarm 874. The audible alarm sounds and the operator pushes the reset button 834 which effectuates a high to appear on lead 830 thereby driving the output of gate 824 low. By this time, the predetermined time interval has elapsed and the tones have gone away making the input to gate 820 over lead 620 low. Thus, the combination of two lows and the input to gate 820 effectuates a high output on lead 822 thereby latching gate 824 into the low output stage. The control circuit 624 is now ready for the next leak detection.

In FIGS. 9 and 10 are shown the details of a preferred embodiment for the pressure detection switch 94 of the present invention. The pressure detector 94 as shown in FIG. 10 includes a lower bellows portion 1000 which is responsive to the pressure in the fuel delivery line for expanding upwardly and downwardly, a housing 1002 which is insertable into the fuel line, an optical detector 1004, which senses the position of expansion of the bellows 1000, and a cap 1006. The operation of the detector will now be described. The lower threaded portion 1008 of the housing 1002 engages the pipe carrying the fuel from the storage tank to the dispenser. The lower end 1010 of the bellows 1000 is open to permit the fuel to flow thereinto. Under normal fuel pressures, the fuel in the delivery line causes the bellows 1000 to expand upwardly thereby driving its integral piston 1012 through a formed passageway 1014 of the cap 1006. The photodetector assembly 1004 mounted integral on the upper surface of the cap 1006 has a passageway receptive of the piston 1002 around which is disposed a light emitting diode 1016 and opposing therefrom a photocell 1018. Therefore, as the bellows expands upwardly, the piston 1012 blocks any light from flowing from the light emitting diode 1016 to the photocell 1018. Thus, under normal fuel pressures, the piston 1012 prevents any electrical signals being generated. If, however, the pressure in the system should drop, the piston 1012 drops causing the light to enter the photocell 1018 and thereupon causing a signal to be generated. The cap 1006 is designed to be adjustable in the threaded passageway 1020 of the housing 1002. Thus, the detector can be readily adapted to any of a number of different pressures in fuel delivery systems. When the desired pressure for detection is obtained, a set screw 1022 is set to lock the cap 1006 to the housing 1002.

In FIG. 9, the bellows 1000 comprises a lower flange portion 1024, a mid-bellows expandable portion 1026, and an upper end cap portion 1028 upon which is disposed an integral upstanding piston 1012. The lower flange portion 1024 is conventionally affixed to the bottom of the housing 1002 so that no leakage can escape from the delivery pipe into the region between the housing 1002 and the outer surface of the bellows 1000. The housing 1002 is a machined integral item having a threaded portion 1008 in an inward threaded passageway 1020 and a formed passageway 1030 to which is inserted the set screw 1032. The cap 1006 is also a machine item having a lower cylindrically shaped smooth surface 1034 and an upper threaded enlarged portion 1036. Formed at both ends of the cap 1006 is an enlarged cavity 1038 at the bottom and a smaller cavity 1040 formed at the top. Formed through the center of the cap 1006 is a passageway 1014 which substantially corresponds to the diameter of the piston 1002. The photo detector assembly 1004 is formed from metal or plastic and contains the photo detector 1018 and the light source 1016 arranged in configuration as shown in FIG. 10.

In system operation, therefore, the leak alarm of the present invention functions as follows. Whenever the pump handle 38 is in the on position, or during the predetermined time interval after the handle is activated from the ON to OFF position, the frequency modulator 212 outputs on lead 214 the waveform shown in FIG. 240. If during that interval the detector 98 senses a drop of pressure, the signal appearing on lead 214 is amplitude modulated into the combined FM and AM signal 243 and extended onto the power line 80 by applier 224.

The predetermined time interval occurring after the switch 38 is moved from the ON to OFF position is determined by the ripple counter 558 shown in FIG. 5. The length of this predetermined time interval can be selected by providing a jumper between line 559 and any of the plurality of outputs of the counter 558. This time interval may range from a few seconds to a few minutes.

Once the pressure detector 98 senses a fall in pressure and the signal appearing on lead 222 as waveform 243 is applied to power lines 80, the receiver shown in FIG. 6 extracts the signal with extractor 600 and that signal which is unique to a particular product line must be of sufficient time duration before a warning light and audible alarm are sounded. This predetermined duration is determined by resistor 816 and capacitor 818 as shown in FIG. 8 and may range from several seconds to a few minutes.

In setting the system up, the installer will determine the particular product line code and install the proper jumpers in the select circuit 208 as presented in the table above to determine the proper $f_0$ and $f_1$ frequencies to uniquely identify that product line from the others. Furthermore, the installer will determined the predetermined time interval after the pump switch 38 is turned from the ON to OFF position during which to determine the pressure of the line by inserting a jumper from lead 559 to one of the outputs of counter 558. Finally, the length in time during which the error signal should be generated over the power line 80 is determined by the appropriate selection of resistor 816 and capacitor 818 in the receiver circuit. The length of the error signal should be sufficiently long to enable the pump 50 to build up pressure within the delivery line at the OFF to ON transition of switch 38.

Although the present invention has been described with a certain degree of particularity, it is understood that the present disclosure has been made by way of example and that changes in details of structure may be made without departing from the spirit thereof including but not limited to other pressure detectors than that disclosed.

Furthermore, while the leak alarm system 10 of the present invention has been shown applied in a preferable embodiment to a filling station environment in the hereinbefore presented disclosure, such disclosure is specifically not intended to limit or delimit the scope of applications of this invention for the detection of leaks in fluid delivery systems in general. One such application may include, for example, milk delivery systems in farm or industrial plants.

We claim:

1. An alarm system for detecting a leak in a fluid delivery line, said system comprising:
    an alarm,
    a detector,
    a power line interconnecting said alarm with said detector,
    said detector being cooperative with the pressure of fluid in said delivery line dropping below a predetermined value for extending a signal over said power line,
    means in said detector for enabling said detector only during the time interval beginning with the flow of fluid in said delivery line and ending a predetermined amount of time after said flow stops, and
    said alarm being receptive of said extended signal on said power line for becoming activated.

2. The alarm system of claim 1 wherein said detector comprises:
means cooperative with the pressure of fluid in said delivery line for indicating when said pressure drops below a predetermined value, and
means responsive to said pressure drop indication for transmitting said signal over said power line.

3. The alarm system of claim 1 wherein said alarm comprises:
means cooperative with said power line and receptive of said extended signal for generating an activation level,
a warning device, and
means operative with the generation of said activation level for enabling said warning device.

4. The alarm system of claim 1 wherein said detector comprises:
means responsive to said pressure drop for forming a unique frequency modulated and amplitude modulated signal, and
means operative upon said formed signal for applying said signal to said power line.

5. The alarm system of claim 4 wherein said alarm comprises:
means cooperative with said power line for extracting said formed signal, and
means receptive of said extracted signal for producing a warning indication.

6. The alarm system of claim 1 in which said alarm is connectable to any one of a plurality of outlets connected to said power line for receiving said signal.

7. An alarm system for detecting a leak in a fluid delivery line, said system comprising:
means cooperative with the pressure of fluid in said delivery line for indicating when said pressure drops below a predetermined value,
a warning device,
a power line interconnecting said indicating means with said warning device,
means responsive to said pressure drop occurring for transmitting said signal over said power line, said transmitting means comprising:
(1) means responsive to said pressure drop for forming a unique frequency modulated and amplitude modulated signal, and
(2) means operative upon said formed signal for applying said signal to said power line,
means cooperative with said power line and receptive of said extended signal for generating an activation level, said generating means comprising:
(1) means cooperative with said power line for extracting said formed signal, and
(2) means receptive of said extracted signal for producing a warning level, and
means operative with the generation of said activation level for enabling said warning device.

8. The alarm of claim 7 wherein said pressure drop must occur within a known time interval.

9. The alarm system of claim 8 wherein said known time interval begins when the flow of fluid in said delivery line begins.

10. The alarm system of claim 9 wherein said known time interval ends a predetermined time interval after the flow of fluid terminates.

11. The alarm system of claim 7 in which said warning device is connectable to any one of a plurality of outlets connected to said power line for receiving said signal.

12. The alarm system of claim 7 in which said signal is of a time duration longer than the time required for said fluid to build up pressure in said delivery line after said fluid begins to flow.

13. An alarm system for detecting leaks in a plurality of fluid delivery lines, said system comprising:
an alarm remote from said delivery line,
a plurality of detectors,
a power line interconnecting said alarm with said plurality of detectors,
each of said detectors being cooperative with the pressure of fluid in its associated delivery line dropping below a predetermined value within a known time interval for extending a signal over said line, said time interval beginning with the start of the flow of fluid in said line and ending a predetermined amount of time after said flow stops, each of said detectors comprising:
(1) means responsive to said pressure drop for forming a unique frequency modulated and amplitude modulated signal, and
(2) means operative upon said formed signal for applying said signal to said power line,
said alarm being receptive of said extended signal on said power line for becoming activated, and said alarm comprising:
(1) means cooperative with said power line for extracting each said formed signal,
(2) means receptive of said extracted signal for producing a warming indication, and
(3) means receptive of said extracted signal for identifying which of said detectors is sensing a pressure drop.

14. The alarm system of claim 13 wherein said alarm comprises:
means cooperative with said power line and receptive of said formed signal for generating an activation level,
a warning device, and
means operative with the generation of said activation level for enabling said warning device.

15. The alarm system of claim 13 further comprising means cooperative with said alarm being activated for resetting said alarm to the deactivated state.

16. A method for detecting leaks in a plurality of fluid delivery lines, said method comprising the steps of:
monitoring the pressure in each of said fluid delivery lines while said fluid is flowing in said delivery line,
indicating when the pressure in one of said fluid delivery lines drops below a predetermined value,
applying a unique coded signal onto the electrical power line for a time duration longer than the time required for the pressure to build up in the fuel delivery line, in response to the indication of pressure drop, said unique coded signal being the identity of said fluid delivery line having the drop in pressure,
extracting the unique coded signal from the electrical power line at a location remote from said monitoring, and
activating an alarm in response to said extraction.

17. The method of claim 16 further comprising the step of identifying the fluid delivery line having the drop in pressure in response to said extraction.

18. A method for detecting leaks in a plurality of fluid delivery lines, said method comprising the steps of:
monitoring the pressure in each of said fluid delivery lines with a pressure detector, indicating when the pressure in one of said fluid delivery lines drops below a predetermined value, mixing a unique frequency modulated signal with a unique amplitude modulated signal to form a unique coded signal in response to said indication of pressure drop, applying a unique coded signal onto the electrical transmission means in response to the indication of pressure drop, said unique coded signal being the identity of said fluid delivery line having the drop in pressure, extracting the unique coded signal from the electrical transmission means at a location remote from said monitoring, and activating an alarm in response to said extraction.

19. The method of claim 18 further comprising the step of identifying the fluid delivery line having the drop in pressure in response to said extraction.

20. The alarm system of claim 1 wherein said signal is longer in time duration than the time required for said delivery line to build up pressure after said fluid flow begins.

21. An alarm system for detecting a leak in a fluid delivery line, said system comprising:

an alarm, a detector, said detector being cooperative with the pressure of fluid in said delivery line dropping below a predetermined value for generating a leak signal, said signal being longer in time duration than the time required for said delivery line to build up pressure after said fluid flow begins, a power line interconnecting said alarm with said detector, means in said detector for enabling said detector only during the time interval beginning with the flow of fluid in said delivery line and ending a predetermined amount of time after said flow stops, means in said detector responsive to said pressure drop indication for transmitting said leak signal over said power line, means in said alarm receptive of said transmitted signal on said power line for generating an activation level, and means in said alarm operative upon the generation of said activation level for enabling said alarm.

22. The alarm of system of claim 1 further comprising:

means operative upon said delivery line for selectively preventing the flow of said fluid, means manually operable for activating said alarm system to detect the lack of pressure in said delivery line and to enable said alarm when said flow is prevented, and means for deactivating said activating means after a predetermined time period.

23. The alarm system of claim 7 further comprising:

means operative upon said delivery line for preventing the flow of said fluid, means manually operable for activating said alarm system to detect the lack of pressure in said delivery line and to enable said alarm when said flow is prevented, and means for deactivating said activating means after a predetermined time period.

24. The alarm system of claim 13 further comprising:

means operative upon said delivery line for preventing the flow of said fluid, means manually operable for activating said alarm system to detect the lack of pressure in said delivery line and to enable said alarm when said flow is prevented, and means for deactivating said activating means after a predetermined time period.

25. The alarm system of claim 21 further comprising:

means operative upon said delivery line for preventing the flow of said fluid, means manually operable for activating said alarm system to detect the lack of pressure in said delivery line and to enable said alarm when said flow is prevented, and means for deactivating said activating means after a predetermined time period.

26. A method for detecting leaks in a plurality of fluid delivery lines, said method comprising the steps of:

monitoring the pressure in each of said fluid delivery lines, indicating when the pressure in one of said fluid delivery lines drops below a predetermined value, applying a unique coded signal onto an electrical transmission means in response to the indication of pressure drop, said unique coded signal being the identity of said fluid delivery line having the drop in pressure, extracting the unique coded signal from the electrical transmission means at a location remote from said monitoring, activating an alarm in response to said extraction, and periodically checking the operation of the detector and the alarm by:

(1) periodically preventing the flow of fluid in the delivery lines, (2) activating the pressure detector to monitor the pressure in response to said prevention of flow, (3) observing whether the alarm is activated in response to the detection of no pressure, and, (4) deactivating the pressure detector after a predetermined amount of time.

27. The method of claim 18 further comprising the step of periodically checking the operation of the detector and the alarm by:

(1) periodically preventing the flow of fluid in the delivery lines, (2) activating the pressure detector to monitor the pressure in response to said prevention of flow, (3) observing whether the alarm is activated in response to the detection of no pressure, and (4) deactivating the pressure detector after a predetermined amount of time.

28. An alarm system for detecting a leak in a fluid delivery line, said system comprising:

an alarm, a detector, a power line interconnecting said alarm with said detector, said detector being cooperative with the pressure of fluid in said delivery line dropping below a predetermined value for extending a signal over said line, said alarm being receptive of said extended signal on said power line for becoming activated, means operative upon said delivery line for preventing the flow of fluid, means manually operable for activating said alarm system to detect the lack of pressure in said delivery line and to enable said alarm when said flow is prevented, and means for deactivating said activating means after a predetermined time period.

29. An alarm system for detecting leaks in a plurality of fluid delivery lines, said system comprising:
an alarm remote from said delivery lines,
a plurality of detectors,
means cooperative with the pressure of fluid in each of said delivery lines for indicating when said pressure drops below a predetermined value, said indicating means comprising:
(1) a photocell, and
(2) means responsive to said pressure drop for directing a beam of light into said cell,
a power line interconnecting said alarm with said plurality of detectors,
means responsive to said pressure drop indication occurring within a given time interval for transmitting said signal over said power line,
said alarm being receptive of said extended signal on said power line for becoming activated.

30. The alarm system of claim 29 in which said directing means comprises:
a bellows connected to said delivery line, said bellows being capable of expanding under the pressure of fluid in said line,
a light source, said light source illuminating said photocell with said light beam, and
means cooperative with said expanded bellows for blocking the illumination of said cell, said blocking means being retracted when said bellows is unexpanded so that said photocell is illuminated.

31. An alarm system for identifying leaks in a plurality of fluid delivery lines, said system comprising:
a separate pressure detector for each of said fluid delivery lines, said detector being capable of emitting a leak signal whenever said pressure in said fluid delivery line drops below a predetermined level,
a single transmission path,
a separate transmitter for each of said detectors, said transmitter being responsive to said leak signal for applying a uniquely coded signal to said transmission path only when the fluid is flowing in said delivery line and for a predetermined time after said flow stops, said uniquely coded signal identifying said delivery line, and
a remote alarm connected to said transmission path and receptive of said applied signal for identifying said leaking delivery line.

32. The alarm system of claim 31 in which each of said detectors comprising:
a photocell,
a bellows connected to said delivery line, said bellows being capable of expanding under pressure of fluid in said line,
a light source, said light source illuminating said photocell with said light beam, and
means cooperative with said expanded bellows for blocking the illumination of said cell, said blocking means being retracted when said bellows is unexpanded so that said photocell is illuminated.

33. The alarm system of claim 31 in which each of said transmitters comprising:
means responsive to the starting flow of said fluid for providing an activation signal, and
means receptive of said activation signal for authorizing said application of said uniquely coded signal to said transmission means, said authorization means being activated as long as said fluid is flowing and for said predetermined time after said flow stops.

34. The alarm system of claim 31 wherein said transmitter comprises:
a free running oscillator for producing a series of pulses,
a modulator receptive of said pulses for producing a formed signal having frequency modulation components of $f_0$ and amplitude modulation components of $f_1$,
means receptive of said leak signal for activating said modulator only when said leak signal is generated while said fluid is flowing and for said predetermined time after said flow stops, and
means receptive of said formed signal for applying said signal to said transmission path.

35. The alarm system of claim 34 in which said transmitter further comprises means connected to said modulator for selectively varying said frequencies $f_0$ and $f_1$ so that each delivery line can have a unique identity code.

36. The alarm system of claim 35 in which said remote alarm comprises:
means connected to said transmission path for extracting said uniquely coded signal from said path,
means receptive of said extracted signal for generating an alarm signal, and
means receptive of said extracted signal for identifying which fluid delivery line is leaking.

37. The alarm system of claim 36 in which said extracting means includes:
a high pass filter responsive to said uniquely coded signal for extending only said $f_0$ frequency and signals,
a low pass filter responsive to said uniquely coded signal for extending only said $f_1$ frequency signals, and
a plurality of tone detectors receptive of said extended $f_0$ and $f_1$ frequencies, only one of said tone detectors being responsive to a $f_0$ and $f_1$ frequency combination for producing an identity signal.

38. The alarm system of claim 31 in which said remote alarm comprises:
means connected to said transmission path for extracting said uniquely coded signal from said path,
means receptive of said extracted signal for generating an alarm signal, and
means receptive of said extracted signal for identifying which fluid delivery line is leaking.

39. An alarm system for identifying leaks in a plurality of fluid delivery lines, said system comprising:
a separate pressure detector for each of said fluid delivery lines, said detector being capable of emitting a leak signal whenever said pressure in said fluid delivery line drops below a predetermined level,
a transmission path,
a separate transmitter for each of said detectors, said transmitter being responsive to said leak signal for applying a uniquely coded signal to said transmission path only when the fluid is flowing in said delivery line and for a predetermined time after said flow stops, said uniquely coded signal identifying said delivery line, each of said transmitters comprising:
(1) means responsive to the starting flow of said fluid for providing an activation signal, and
(2) means receptive of said activation signal for authorizing said application of said uniquely coded signal to said transmission means, said authorization means being activated as long as said fluid is flowing and for said predetermined time after said flow stops, and a remote alarm connected to said transmission path and receptive of said applied signal for identifying said leaking delivery line, said remote alarm comprising:
  (1) means connected to said transmission path for extracting said uniquely coded signal from said path,
  (2) means receptive of said extracted signal for generating an alarm signal, and
  (3) means receptive of said extracted signal for identifying which fluid delivery line is leaking.

40. The alarm system of claim 39 in which each of said detectors comprises:
  a photocell,
  a bellows connected to said delivery line, said bellows being capable of expanding under pressure of fluid in said line,
  a light source, said light source illuminating said photocell with said light beam, and
  means cooperative with said expanded bellows for blocking the illumination of said cell, said blocking means being retracted when said bellows is unexpanded so that said photocell is illuminated.

41. The alarm system of claim 39 wherein said transmitter comprises:
  a free running oscillator for producing a series of pulses,
  a modulator receptive of said pulses for producing a formed signal having frequency modulation components of $f_0$ and amplitude modulation components of $f_1$,
  means receptive of said leak signal for activating said modulator only when said leak signal is generated while said fluid is flowing and for said predetermined time after said flow stops, and
  means receptive of said formed signal for applying said signal to said transmission path.

42. The alarm system of claim 41 in which said transmitter further comprises means connected to said modulator for selectively varying said frequencies $f_0$ and $f_1$ so that each delivery line can have a unique identity code.

43. The alarm system of claim 42 in which said remote alarm comprises:
  means connected to said transmission path for extracting said uniquely coded signal from said path,
  means receptive of said extracted signal for generating an alarm signal, and
  means receptive of said extracted signal for identifying which fluid delivery line is leaking.

44. The alarm system of claim 43 in which said extracting means includes:
  a high pass filter responsive to said uniquely coded signal for extending only said $f_0$ frequency,
  a low pass filter responsive to said uniquely coded signal for extending only said $f_1$ frequency, and
  a plurality of tone detectors receptive of said extended $f_0$ and $f_1$ frequencies, only one of said tone detectors being responsive to a $f_0$ and $f_1$ frequency combination for producing an identity signal.

* * * * *